US008824275B2

(12) United States Patent
Zhang

(10) Patent No.: US 8,824,275 B2
(45) Date of Patent: Sep. 2, 2014

(54) ROUTE CALCULATING AFTER SWITCHING OCCURS FROM A PRIMARY MAIN CONTROL BOARD TO A STANDBY MAIN CONTROL BOARD

(75) Inventor: Changjun Zhang, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 198 days.

(21) Appl. No.: 13/524,965

(22) Filed: Jun. 15, 2012

(65) Prior Publication Data

US 2012/0320754 A1 Dec. 20, 2012

(30) Foreign Application Priority Data

Jun. 16, 2011 (CN) .......................... 2011 1 0162828

(51) Int. Cl.
*G01R 31/08* (2006.01)
*H04L 12/26* (2006.01)

(52) U.S. Cl.
USPC ........................................... 370/217; 370/229

(58) Field of Classification Search
CPC ..... H04L 45/12; H04L 49/557; H04L 45/026; H04L 41/0654; H04L 47/12; H04L 45/48; H04L 12/46
USPC .......................... 370/217–221, 229, 235, 238
See application file for complete search history.

(56) References Cited

U.S. PATENT DOCUMENTS

| | | | | |
|---|---|---|---|---|
| 2003/0012189 | A1 * | 1/2003 | Nomura et al. | 370/389 |
| 2006/0023708 | A1 * | 2/2006 | Snively et al. | 370/389 |
| 2008/0198865 | A1 * | 8/2008 | Rudnick et al. | 370/406 |
| 2009/0086622 | A1 * | 4/2009 | Ng | 370/219 |
| 2011/0085569 | A1 * | 4/2011 | Gnanasekaran et al. | 370/419 |

FOREIGN PATENT DOCUMENTS

| | | |
|---|---|---|
| CN | 1889464 | 1/2007 |
| CN | 101719838 A | 6/2010 |
| CN | 102025552 | 4/2011 |

OTHER PUBLICATIONS

CN First Office Action dated Aug. 5, 2013 issued on CN Patent Application No. 201110162828.3 dated Jun. 16, 2011, The State Intellectual Property Office, P.R. China.

* cited by examiner

*Primary Examiner* — Xavier Szewai Wong

(57) ABSTRACT

Calculating routing after switching occurs from a primary main control board to a standby main control board in a Fiber Channel (FC) switch includes receiving neighbor Link State Records (LSRs) sent by the primary main control board and backing up the neighbor LSRs on the standby main control board. The standby main control board is triggered to be promoted to the primary main control board, and an adjacency relationship is established with neighbors according to the backed up neighbor LSRs. LSRs of the switch are generated based on available ports on the switch and the neighbors, and a message is sent for maintaining the adjacency relationship to the neighbors with which the adjacency relationship has been established. Routing is calculated based on the neighbor LSRs and the LSRs of the switch.

14 Claims, 4 Drawing Sheets primary main control board
standby main control board
monitoring module
301, configuration management information
302,saving configuration management information
303,configuration management information
404,saving configuration management information
305,LSU message
306,obtaining the neighbor LSRs and verifying validity
307,neighbor LSRs
308,saving the neighbor LSRs
board in-place check
309, primary main control board is not in place
410,promotion notification
411,FSPF protocol running
412,identifying validity
413,establishing adjacency relationship
414,generating LSRs of the switch
415,sending HLO message
416,calculating routing
417,the switch runs normally port unplugged or other reasons for switching to occur from a primary main control board to a standby main control board in the switch

ROUTE CALCULATING AFTER SWITCHING OCCURS FROM A PRIMARY MAIN CONTROL BOARD TO A STANDBY MAIN CONTROL BOARD

CLAIM FOR PRIORITY

The present application claims priority under 35 U.S.C 119(a)-(d) to Chinese Patent application number 201110162828.3, filed on Jun. 16, 2011, which is incorporated by reference in its entirety.

BACKGROUND

Fabric Shortest Path First (FSPF) protocol is a link-based dynamic routing discovery protocol used by a Fabric Channel (FC) network, and each FC switch that supports the FSPF protocol can describe its relationship with the neighbor FC switches by a Link State Record (LSR) that it has generated.

Each time the FC switch discovers a neighbor FC switch, it can synchronize the LSR in their respective Link-State Database (LSDB) with said neighbor FC switch each other, then said FC switch will calculate the shortest routing from said FC switch to any other FC switch based on the LSRs in its LSDB.

Specifically, the FC switches that are neighbors of each other carry out the processes of finding out each other, synchronizing the LSDB and maintaining each other based on their respective corresponding neighbor state machines.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

The LSR includes a Link State (LS) Header, Number of Links, and several Link Descriptors. The LS Header has an LSR Type field, and the type of LSR is used by the FC switch to describe its relationship with the neighbor FC switches. The LS header also has an Age field, which represents the age (in seconds) of the LSR where said LS header resides, and the Age field is 0 when the LSR is just generated. An LSR whose Age field reaches a maximum (e.g., 3600 seconds) may be deleted. Other fields may be included in the LS Header. The Number of Links represents the number of the Link Descriptor fields included in the LSR. In one example, each Link Descriptor field has one Link Description of a FULL state link.

In the following, certain examples are described in detail with reference to the drawings.

Figure 1:
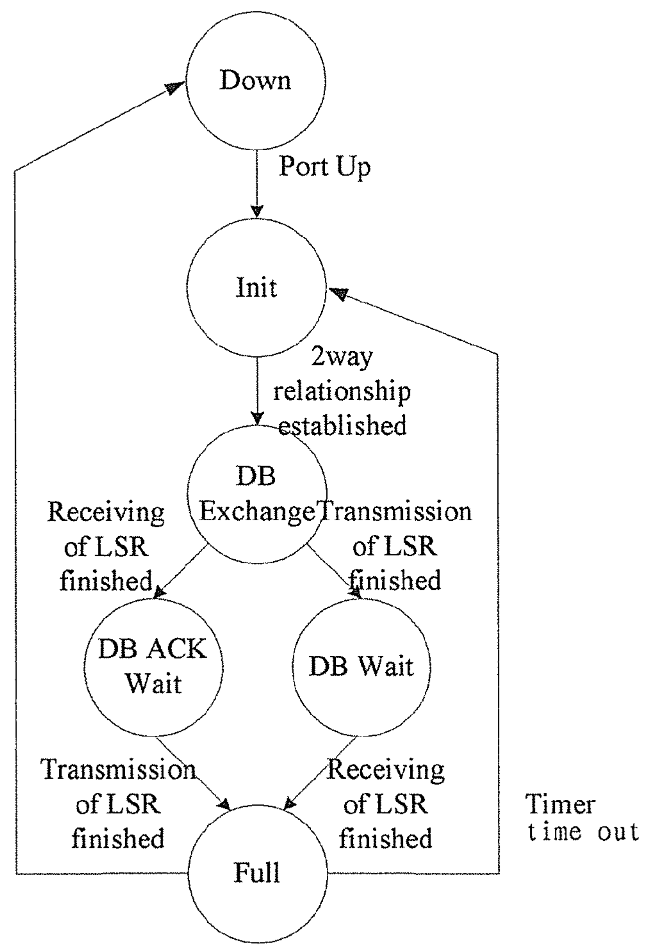
FIG. 1 is a schematic drawing of a neighbor state machine in an FC switch according to an example.

With the reference to FIG. 1, FIG. 1 is a schematic drawing of a neighbor state machine in an FC switch according to an example. The states and the ways of transition of the neighbor state machines are as follows:

a Down state, which is the initial state and in which a notification of the port being Up reported by a corresponding port connected to a neighbor FC switch is waited, and upon receiving said notification, the state transits to the Init state;

an Init state, in which a Hello (HLO) message of a Switch Fabric Internal Link Service (SW_ILS) protocol is sent to the neighbor FC switch at a pre-set interval (HLO SW_ILS_Interval), and upon receiving the HLO message sent by the neighbor FC switch, discovery of the neighbor FC switch is realized and the Domain ID and Port Index carried in said HLO message are stored for use when subsequently generating the LSR; if the Domain ID field carried in said HLO message is filled by the Domain ID of the FC switch, then said HLO message is the two-way HLO message indicating that the neighbor FC switch has also discovered the FC switch, then a two-way relationship is established with the neighbor FC switch at the opposite side, and then the state transits to a Database (DB) Exchange state;

DB Exchange state, all LSRs in the LSDB of the FC switch are sent to the neighbor FC switch by means of a Link State Update (LSU) message of the SW_ILS protocol, wherein a Flag in an LSU message sending the last LSR is set to a value indicating that all LSRs have been sent; meanwhile, the LSRs sent from the neighbor FC switch to the FC switch are received, and each time an LSR is received, a response is made by means of a Link State Acknowledgement (LSA) message of the SW_ILS protocol, and if an LSR is newer than those in the LSDB of the FC switch or is not included in the LSDB of the FC switch, the LSR is updated into the LSDB of the FC switch; moreover, if the FC switch sends all the LSRs earlier than the neighbor FC switch, then the state transits to a Database (DB) Wait state, while if the FC switch sends all the LSRs later than the neighbor FC switch, then the state transits to a Database Acknowledgement Wait (DB ACK Wait) state;

DB ACK Wait state, when the LSA message for the last LSR sent by the neighbor FC switch is received, the state transits to a Full state;

DB Wait state, when the LSU message of the last LSR sent by the neighbor FC switch is received, the state transits to a Full state.

As long as the corresponding neighbor state machines of the two neighbor FC switches have both transited to the Full state, the two neighbor FC switches become an Adjacency relationship. The two FC switches becoming the Adjacency relationship can respectively calculate the shortest routing from themselves to any other FC switch that they could arrive at through opposite side, and the routing does not generate a loop, and the calculated routing can be used to realize the FSPF routing forwarding. The Adjacency relationship may be maintained through periodically sending HLO messages to each other.

The FSPF routing forwarding can be realized in the above-mentioned manner, but for some high-end FC switches that have a distributed structure, there may be the following problems:

In FC switches of a distributed structure, the traffic processing in the control level and the forwarding processing in the forwarding level are separated, that is, the traffic processing is mainly focused on the main control board, while the forwarding processing is handled by the interface board so as to upgrade respective processing power of traffic processing and forwarding processing to a great extent. The main control board is divided into a primary main control board and a standby main control board. When the primary main control board does not operate normally, the standby main control board takes over the primary main control board, thus increasing reliability of the traffic processing.

However, when switching occurs from a primary main control board to a standby main control board in certain FC switches, the new primary main control board switched from the standby main control board re-performs the neighbor discovery process, and performs the respective processing starting from the Down state to the Full state for the neighbor state machine of each discovered neighbor FC switch. Then it re-calculates the routing passing each neighbor FC switch; accordingly, all the neighbor FC switches are caused to timeout of timer because they cannot receive the periodic HLO messages (the timeout period may be the period of sending four HLO messages, which is 80 seconds), in turn, each neighbor FC switch sets the neighbor state machine it has maintained internally back to the Init state, wherein each neighbor state machine corresponds to the FC switch in which switching occurs from a primary main control board to a standby main control board. Because of the setting back to the Init state, the LSRs and all routing of the FC switch in which switching occurs from a primary main control board to a standby main control board are deleted, and the routing of the FC switch in which switching occurs from a primary main control board to a standby main control board are re-calculated until all the processing of transiting from the Init state to the Full state have been performed for the neighbor state machine corresponding to the FC switch in which switching occurs from a primary main control board to a standby main control board.

It can be seen from the above that with respect to an FC switch which has separated main control board and interface board and which has switchable primary main control board and standby main control board, after switching occurs from a primary main control board to a standby main control board and before completion of re-calculating the routing, although the forwarding processing of the interface board of the FC switch in which switching occurs from a primary main control board to a standby main control board may not be interrupted due to switching from the primary main control board to the standby main control board switching in the main control board, all the neighbor FC switches are not able to realize the FPSF routing forwarding through the FC switch in which switching occurs from a primary main control board to a standby main control board for a certain period of time because of the deletion of the related LSRs and routing.

Switch backup has the following problems:

The primary main control board backs up the received LSU message on the standby main control board, so that the standby main control board can acquire the LSRs of respective neighbor from said LSU message, after the standby main control board successfully receives the backup LSU message. The primary main control board sends an acknowledgement message to the neighbor FC switches, but if the primary main control board fails to send an acknowledgement message to the neighbor FC switches, then the neighbor FC switches retransmits the LSU message continuously, which causes the primary main control board to continuously retransmit to the standby main control board the LSU message that has already been backed up, thereby resulting in a channel congestion in the switch.

Regarding another switch backup problem, to ensure the correctness of the routing on the standby main control board, the primary main control board backs up, onto the standby main control board, the routing or the key data (e.g. neighbor information, port information) that can be used by the standby main control board for generating the LSR of the switch. If the routing is backed up directly, the routing may be easily and frequently backed up onto the standby main control board because of the frequent change in the network topology structure, which results in a channel congestion in the switch. If the key data are backed up, since the standby main control board generates the LSR of the switch before switching occurs from a primary main control board to a standby main control board, the condition of the primary main control board has to be considered, thus problems like the time sequence of the backing up and solutions to be taken when backup failure occurs have to be considered, which complicates the implementation.

In order to avoid occurrence of interruption when a neighbor performs FPSF routing forwarding through an FC switch in which switching occurs from the primary main control board to the standby main control board, according to an example, the neighbor does not delete the LSR and the related routing of the FC switch in which switching occurs from the primary main control board to the standby main control board, and the LSR and related routing are not deleted. Also state fallback is avoided of the neighbor state machine maintained by the neighbor for the FC switch in which switching occurs from the primary main control board to the standby main control board.

Furthermore, according to an example, the primary main control board backs up the neighbor LSR onto the standby main control board before switching occurs from the primary main control board to the standby main control board, and then the standby main control board directly establishes the adjacency relationship with each of the neighbors according to the backed up neighbor LSR after switching occurs from the primary main control board to the standby main control board, and resumes sending messages for maintaining the adjacency relationship to the neighbors immediately after generating the LSR of the switch.

Since the standby main control board can directly establish the adjacency relationship with each of the neighbors, the neighbors can be unaware of the occurrence of switching from the primary main control board to the standby main control board switching, thereby avoiding the above-mentioned state fallback caused by the neighbors being aware of the occurrence of switching from the primary main control board to the standby main control board. Furthermore, the time for establishing the adjacency relationship after realizing the switching by software and for generating the LSR of the switch is less than the timeout period (e.g., 80 seconds) that causes the timers of the neighbors to be timeout, so sending messages for maintaining the adjacency relationship to the neighbors is resumed immediately after generating the LSR of the switch, thereby avoiding the above-mentioned state fallback caused by the neighbors failing to receive messages for maintaining the adjacency relationship before timeout of the timer.

Furthermore, in order to avoid channel congestion in the switch caused by retransmitting the LSU message, the primary main control board directly provides the neighbor LSR and may not provide all the received LSU messages to the standby main control board. Also, in order to avoid channel congestion in the switch caused by frequent change in the topology structure and to avoid complicating the implementation by taking the condition of the primary main control board into consideration, the primary main control board does not have to back up routing onto the standby main control board, and the standby main control board does not have to generate the LSR of the switch before switching occurs from the primary main control board to the standby main control board. Instead, the standby main control board generates the LSR of the switch after being promoted to be the primary main control board and calculates the routing by itself. This is because that the original primary main control board has become invalid after the standby main control board is promoted to be the primary main control board and that the standby main control board no longer needs to consider the condition of the primary main control board when the LSR of the switch is generated and the routing is calculated.

The above are general descriptions of examples of the methods and devices for continuing to forward after switching occurs from the primary main control board to the standby main control board in the disclosure. Now detailed descriptions are given below for the method and device for continuing to forward after switching occurs from the primary main control board to the standby main control board in the disclosure.

Figure 2:
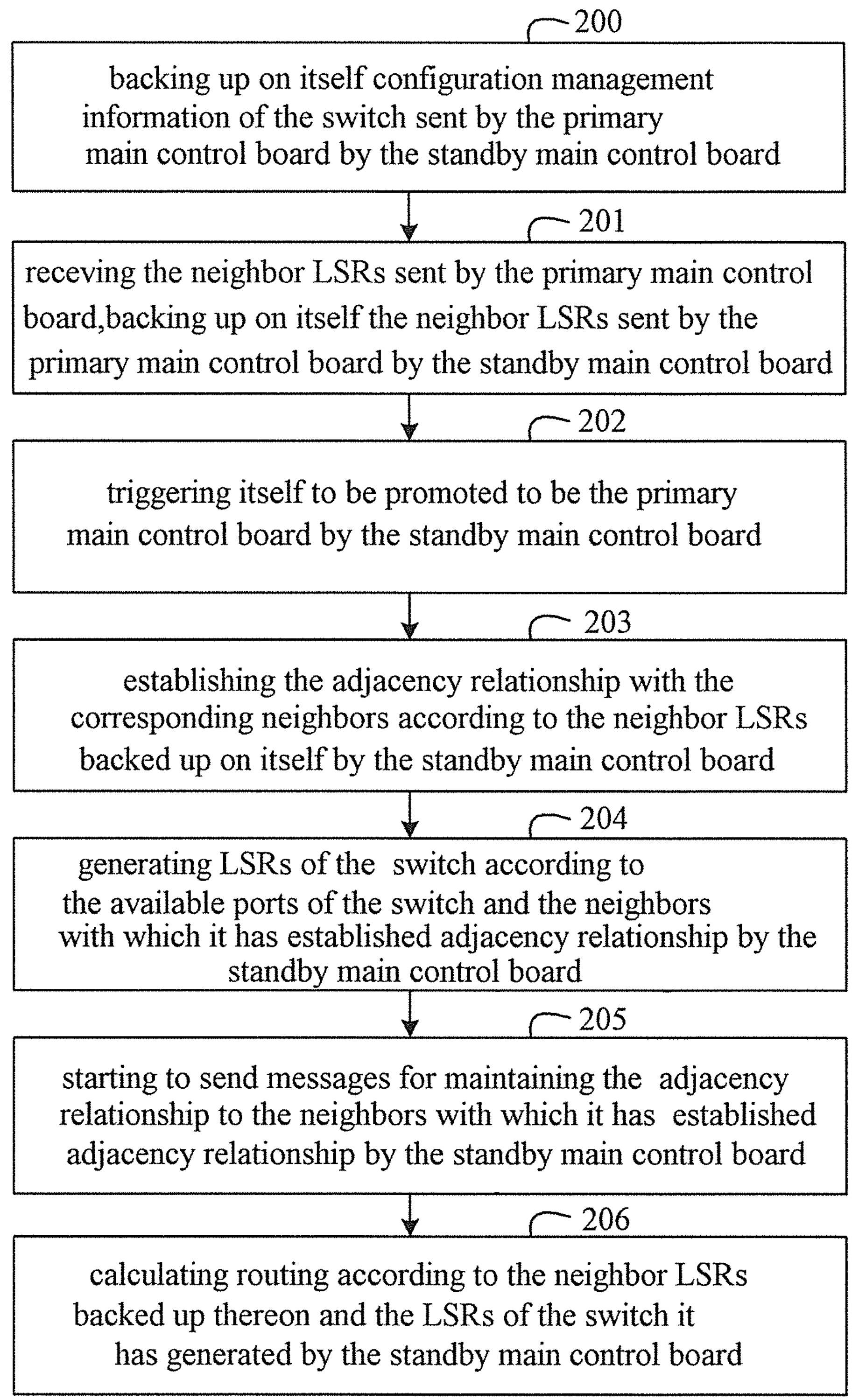
FIG. 2 is an exemplary flow chart of a method for continuing to forward after switching occurs from a primary main control board to a standby main control board according to an example.

With the reference to FIG. 2, FIG. 2 is a flow chart of a method for continuing to forward after switching occurs from a primary main control board to a standby main control board according to an example. Said method may be applied to an FC switch supporting the FSPF protocol and comprising the primary main control board, an interface board and the standby main control board.

At block 200, the method includes sending configuration management information of the switch configured on the primary main control board by the user to the standby main control board by the primary main control board, and backing up on itself the configuration management information of the switch sent by the primary main control board by the standby main control board.

Wherein, the configuration management information at least includes the domain ID of the switch, and the port configuration information of an available port of the switch. The configuration management information may include other management information.

If the standby main control board can obtain the configuration management information of the switch by itself, for example, the user can directly configure the configuration management information of the switch on the standby main control board, or the standby main control board can automatically read the configuration management information of the switch from any memory component of the switch, then block 200 may not be performed and this flow chart can be started from the following block 201.

At block 201, the method includes synchronizing the neighbor LSRs acquired from the LSU messages received from neighbors to its LSDB and sending them to the standby main control board at the same time by the primary main control board, then receiving the LSRs sent by the primary main control board by the standby main control board and backing up on itself the neighbor LSRs sent by the primary main control board.

In one example, the primary main control board may not synchronize each of the acquired neighbor LSRs to its LSDB and send them to the standby main control board at the same time, but it may only update the neighbor LSRs that are newer than those in its LSDB and/or the neighbor LSRs that are not included in its LSDB to its LSDB and send them to the standby main control board at the same time.

There may be a plurality of neighbors, and the same one neighbor may send LSU messages more than once, so this block may be performed more than once and in real time.

At block 202, the method includes triggering the standby main control board to be promoted to the primary main control board after learning that it should be promoted to be the primary main control board.

In one example, the standby main control board may learn that it should be promoted to the primary main control board according to a notification sent by a monitoring module arranged inside the switch. The monitoring module may be used for detecting in real time whether the primary main control board is in place, and it may be either a software module carried on the standby main control board or a hardware structure arranged on the standby main control board or independent of the standby main control board.

In addition, the subsequent blocks of this flow may be performed by means of the FSPF protocol running on said board, so before starting said subsequent blocks, running of the FSPF protocol on said board is triggered. The specific timing of triggering may be after the standby main control board has been powered on; of course, the specific timing of triggering may also be in block 202 so as to reduce the overhead of the standby main control board.

Running the FSPF protocol may include enabling the available ports (which can be learned from the port configuration information in the configuration management information) of the switch, enabling the FSPF protocol identify the available ports of the switch, and creating data structures of the FSPF protocol for the available ports of the switch, and so on.

At block 203, the method includes establishing an adjacency relationship with corresponding neighbors according to the neighbor LSR backed up on the standby main control board by itself.

For example, the standby main control board may traverse all the neighbor LSRs backed up on itself, and in turn establish the adjacency relationship with the corresponding neighbors. Wherein, the adjacency relationship mentioned herein refers to the Adjacency relationship when the neighbor state machine is in a Full state, i.e. the standby main control board creates a corresponding neighbor state machine for each neighbor, and the created neighbor state machine is in the Full state rather than other states upon completion of the creation. Establishing the adjacency relationship may further include creating data structures of the FSPF protocol for the neighbors by the standby main control board.

At block 204, the method includes generating an LSR of the switch according to the available ports (which can be learned from the port configuration information in the configuration management information) of the switch and the neighbors with which the adjacency relationship has been established by the standby main control board.

At block 205, the method includes starting to send messages (e.g. HLO message) for maintaining the adjacency relationship to the neighbors with which the adjacency relationship has been established by the standby main control board.

The block for starting to send messages to the neighbors with which the adjacency relationship has been established may include starting to send messages periodically so as to maintain the adjacency relationship with the neighbors.

At block 206, the method includes calculating a routing by the standby main control board according to the neighbor LSRs backed up thereon and the LSR of the switch it has generated.

So far, this flow completes, and the original standby main control board that has been promoted to be the new primary main control board can enable the switch to operate normally.

In addition, there may be circumstances in which the neighbors mistakenly send the LSRs, namely, the neighbors sending LSRs to the switch are not directly connected to the switch. Wherein, the neighbor LSRs sent by other FC switches (i.e. neighbors) directly connected to the switch are valid neighbor LSRs whose link identity is the domain ID of the switch and whose link description includes the neighbor port index; while the neighbor LSRs sent by other FC switches not directly connected to the switch are invalid neighbor LSRs whose link identity is not the domain ID of the switch, or whose link description does not include the neighbor port index, although the link identity is the domain ID of the switch. Therefore, neighbor LSRs whose link identity is the domain ID of the switch and whose link description includes the neighbor port index are valid neighbor LSRs, while the neighbor LSRs whose link identity is not the domain ID of the switch, or whose link description does not include the neighbor port index (although the link identity is the domain ID of the switch) are invalid neighbor LSRs.

In this case, if the standby main control board establishes an adjacency relationship in block 203 according to the invalid neighbor LSRs and calculates routing in block 206, then the calculated routing is inaccurate.

Hence, the invalid neighbor LSRs may be excluded and to further determine, after block 301 (but until the FSPF protocol starts running on said board), whether the neighbor LSRs backed up on said board are valid, so that block 303 may only establish adjacency relationship with valid neighbors, and that the block 306 may calculate routing based on neighbor LSRs which are only limited to the valid neighbor LSRs.

The specific timing of performing said determination may be before block 203, but of course, it may also be performed simultaneously with block 203 or simultaneously with block 203 and block 206.

The specific ways of performing said determination may include the following:

The first way is that the primary main control board verifies, after obtaining each neighbor LSRs, whether it is valid, and only the valid neighbor LSRs are sent to the standby main control board to be backed up by block 201.

The second way is that the primary main control board verifies, after obtaining each neighbor LSRs, whether it is valid, but it will send both the valid and the invalid neighbor LSRs to the standby main control board to be backed up, only that the invalid neighbor LSRs are identified, and said identifications are used as the basis for identifying invalid neighbor LSRs in block 203 and block 206.

For example, a value of a reserved field in LSR Headers of a valid neighbor LSRs is a default initial value 0, and a value of a reserved field in a LSR Headers of invalid neighbor LSRs can be identified as a preset value 1 different from the initial value 0 by the primary main control board, and the standby main control board may directly learn the validity of neighbor LSRs according to the value of the reserved field in the LSR Headers of the neighbor LSRs.

Another example is that a value of a reserved field in a link description of a message inner layer of valid neighbor LSRs is a default initial value 0, and a value of a reserved field in a link description of a message inner layer of invalid neighbor LSRs can be identified as a preset value 1 different from the initial value 0 by the primary main control board, thus the standby main control board may first determine whether the link identity in the link description of the message inner layer of a neighbor LSRs is the domain ID of the switch, and if it is not the domain ID of the switch, said neighbor LSRs are directly determined as being invalid; if it is the domain ID of the switch, then the standby main control board further checks the value of the reserved field in the link description of the message inner layer, when said reserved field has an initial value 0, the neighbor LSRs is determined to be valid, when said reserved field has a preset value 1, the neighbor LSRs is determined to be invalid.

The above two ways can both prevent the standby main control board from establishing adjacency relationship and calculating routing based on invalid neighbor LSRs. The second way can use any identity and identifying method as long as the standby main control board can identify the invalid neighbor LSRs, while this document will not describe them one by one.

Figure 3:
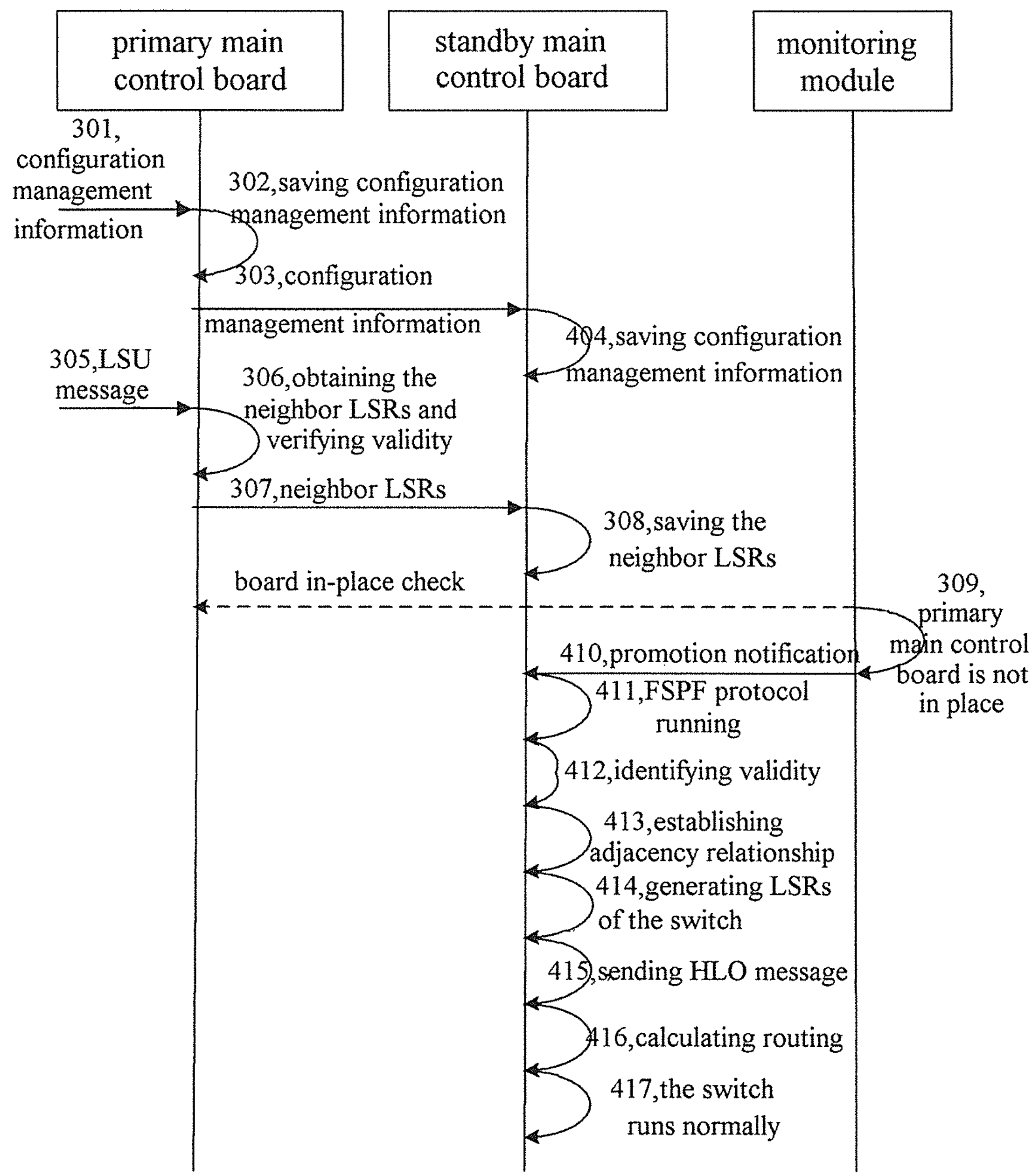
FIG. 3 is a flow chart of a method for continuing to forward after switching occurs from a primary main control board to a standby main control board according to another example.

With the reference to FIG. 3, FIG. 3 is a flow chart of a method for continuing to forward after switching occurs from a primary main control board to a standby main control board according to another example.

At block 301, the method includes receiving configuration management information of the switch configured on said board by the user by the primary main control board.

At block 302, the method includes saving configuration management information of the switch configured on said board by the user by the primary main control board.

At block 303, the method includes sending configuration management information of the switch configured on said board by the user to the standby main control board by the primary main control board.

At block 304, the method includes backing up on said board configuration management information of the switch sent by the primary main control board by the standby main control board.

At block 305, the method includes receiving LSU messages from the neighbors by the primary main control board.

At block 306, the method includes obtaining the neighbor LSRs from the received LSU messages and verifying whether the obtained neighbor LSRs are valid or not, and keeping the value of the reserved field of the valid neighbor LSRs to be the default initial value 0, and modifying the value of the reserved field of the invalid neighbor LSRs to be a preset value 1 different from the initial value 0 by the primary main control board.

At block 307, the method includes synchronizing the obtained and verified neighbor LSRs (comprising valid and invalid) onto its LSDB and sending them to the standby main control board at the same time by the primary main control board.

At block 308, the method includes backing up on said board the neighbor LSRs (comprising valid and invalid) sent by the primary main control board by the standby main control board.

In this block, the primary main control board may not synchronize each of the obtained neighbor LSRs to its LSDB and send them to the standby main control board at the same time, but it may only update the neighbor LSRs that are newer than those in its LSDB and/or the neighbor LSRs that are not included in its LSDB to its LSDB and send them to the standby main control board at the same time.

There may be a plurality of neighbors, and the same one neighbor may send LSU messages more than once, so block 307 and block 308 may be performed more than once and in real time.

At block 309, the method includes detecting that the primary main control board is no longer in place by a monitoring module for checking in real time whether the primary main control board is in place.

At block 310, the method includes sending a promotion notification to the standby main control board by the monitoring module.

At block 311, the method includes triggering the running of the FSPF protocol thereon by the standby main control board after learning that it needs to be promoted to be the primary main control board.

In this block, running the FSPF protocol mainly includes enabling the available ports (which can be learned from the port configuration information in the configuration management information) of the switch, enabling the FSPF protocol identify the available ports of the switch, and creating data structures of the FSPF protocol for the available ports of the switch and so on.

At block 312, the method includes verifying whether a neighbor LSRs are valid or not by the standby main control board according to whether the value of the reserved field of the neighbor LSRs backed up on said board is an initial value 0 or a preset value 1.

At block 313, the method includes establishing adjacency relationship with the corresponding neighbors by the standby main control board according to the valid neighbor LSRs backed up thereon.

During specific implementation, the standby main control board may traverse all the neighbor LSRs backed up thereon, and verify each of the traversed neighbor LSRs, and only the valid neighbor LSRs will establish the corresponding adjacency relationship, i.e. the Adjacency relationship when the neighbor state machine is in a Full state. That is to say, the above blocks 312-313 may be repeated in a circular manner with the process of traversing.

At block 314, the method includes generating an LSR of the switch according to the available ports (which can be learned from the port configuration information in the configuration management information) of the switch and the neighbors with which it has established adjacency relationship by the standby main control board.

At block 315, the method includes starting to send HLO messages for maintaining the adjacency relationship to the neighbors with which it has established adjacency relationship by the standby main control board.

Said block for starting to send messages to the neighbors with which it has established adjacency relationship may include starting to send messages periodically so as to maintain the adjacency relationship with the neighbors.

At block 316, the method includes calculating routing by the standby main control board according to the neighbor LSRs backed up thereon and the LSR of the switch it has generated.

At block 317, the method includes making the standby main control board already have the traffic processing capability of the primary main control board, and enabling a normal operation of the switch.

Figure 4:
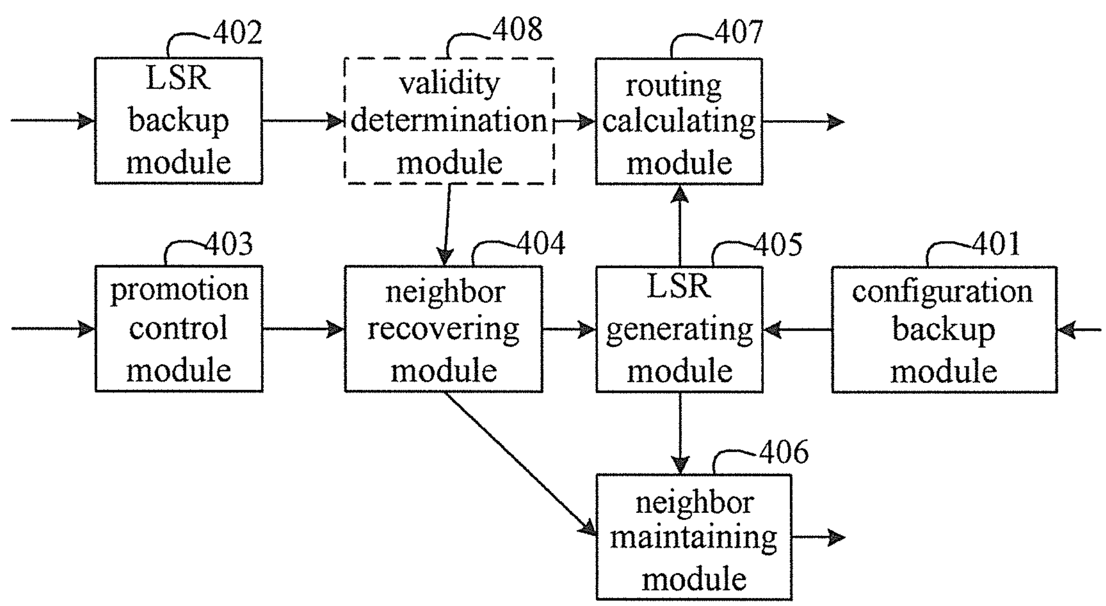
FIG. 4 is an exemplary structural diagram of a device for continuing to forward after switching occurs from a primary main control board to a standby main control board according to an example.

With the reference to FIG. 4, FIG. 4 is an exemplary structural diagram of a device for continuing to forward after switching occurs from a primary main control board to a standby main control board according to an example. Said device is in an FC switch supporting the FSPF protocol and comprising the primary main control board, an interface board and the standby main control board, and said device is arranged on the standby main control board of the above-mentioned FC switch and comprises the structures described below as shown in FIG. 4.

A configuration backup module 401 backs up on the said board configuration management information of the switch sent by the primary main control board. The configuration management information includes the domain ID of the switch and the port configuration information of the available ports of the switch.

If the standby main control board can obtain the configuration management information of the switch by itself, for example, the user can directly configure the configuration management information of the switch on the standby main control board, or the standby main control board can automatically read the configuration management information of the switch from any memory component of the switch, then the configuration backup module may be not arranged.

An LSR backup module 402 receives the LSRs sent by the main control board and backs up on the said board the neighbor LSRs sent by the primary main control board.

A promotion control module 403 triggers promotion of the board into the primary main control board after learning that the board should be promoted into the primary main control board.

In one example, the promotion control module 403 may be connected to a monitoring module arranged inside the switch, and learns that the board should be promoted into the primary main control board from a notification sent by a monitoring module arranged inside the switch. The monitoring module is mainly used for detecting in real time whether the primary main control board is in place, and it may be either a software module carried on the standby main control board or a hardware structure arranged on the standby main control board or independent of the standby main control board.

In addition, some of the modules in the device that start to work only after the board has been promoted to be the primary main control board may depend on the FSPF protocol running on said board, so the promotion control module 403 may further trigger the running of the FSPF protocol on the board. Of course, if the standby main control board, after being powered on, can automatically trigger the running of the FSPF protocol on the board, it is unnecessary for the promotion control module 403 to perform this operation again.

Running the FSPF protocol may include enabling the available ports (which can be learned from the port configuration information in the configuration management information) of the switch, enabling the FSPF protocol identify the available ports of the switch, and creating data structures of the FSPF protocol for the available ports of the switch, and so on.

A neighbor recovering module 404 establishes an adjacency relationship with the corresponding neighbors according to the neighbor LSRs backed up on said board by the LSR backup module 402 after triggering the running of the FSPF protocol in the board by the promotion control module 403. The neighbor recovering module 404 may traverse all the neighbor LSRs backed up on said board and in turn establish the adjacency relationship with the corresponding neighbors. Wherein, the adjacency relationship refers to the Adjacency relationship when the neighbor state machine is in a Full state, i.e. the standby main control board will still create a corresponding neighbor state machine for each neighbor, and the created neighbor state machine is in the Full state rather than other states upon completion of the creation, thus this module is named “neighbor recovering” module. Establishing the adjacency relationship may further includes processing like creating data structures of the FSPF protocol and so on.

A LSR generating module 405 generates LSRs of the switch according to the available ports (which can be learned from the port configuration information in the configuration management information) of the switch and the neighbors with which the board has established the adjacency relationship by the neighbor recovering module 404.

A neighbor maintaining module 406 sends messages (e.g. HLO message) for maintaining the adjacency relationship to the neighbors with which the board has established an adjacency relationship by the neighbor recovering module 404, after the LSR generating module 402 has generated the LSR of the board. Wherein, the neighbor maintaining module 406 periodically sends messages for maintaining the adjacency relationship so as to maintain the adjacency relationship with the neighbors.

A routing calculating module 407 calculates routing according to the neighbor LSRs backed up on the board by the LSR backup module 402 and the LSR of the switch generated for the board by the LSR generating module 405.

In addition, there may be circumstances in which the neighbors mistakenly send the LSRs, namely, validity issue of the neighbor LSRs may arise.

Therefore, the device shown in FIG. 4 may further comprise a validity determination module 408 (shown by the block of dotted lines in FIG. 4) for identifying the valid neighbor LSRs from the neighbor LSRs sent by the primary main control board, so that the neighbor LSRs which the neighbor recovering module 404 and routing calculating module 407 are based on are only limited to the valid neighbor LSRs.

In an example, the primary main control board verifies, after obtaining each neighbor LSRs, whether it is valid, but it will send both the valid and the invalid neighbor LSRs to the standby main control board to be backed up, with the invalid neighbor LSRs being identified. Thus the validity determination module 408 can distinguish the valid neighbor LSRs according to an identification made on the neighbor LSRs by the primary main control board.

For example, the value of the reserved field in the LSR Headers of valid neighbor LSRs is an initial value 0, and the value of the reserved field in the LSR Headers of invalid neighbor LSRs is a preset value 1 different from the initial value 0, thus the validity determination module 408 distinguishes the valid neighbor LSRs according to the value of the reserved field in the LSR Headers of the LSRs.

Another example is that the value of the reserved field in the link description of valid neighbor LSRs is an initial value 0, and the value of the reserved field in the link description of invalid neighbor LSRs is a preset value 1 different from the initial value 0, thus the validity determination module 408 first determine whether the link identity in the link description of a neighbor LSRs is the domain ID of the switch, and if it is not the domain ID of the switch, said neighbor LSRs are directly determined as being invalid; if it is the domain ID of the switch, then the value of the reserved field in the link description is checked, when said reserved field has an initial value 0, the neighbor LSRs is determined to be valid, when said reserved field has a preset value 1, the neighbor LSR is determined to be invalid.

Any identity and identifying method can be adopted as long as the neighbor recovering module 404 and the routing calculating module 407 can identify the invalid neighbor LSRs, while this document will not describe them one by one.

Wherein, the modules of the device of the example can be integrated together or deployed separately. Said modules can be combined into one module or further divided into multiple sub-modules. The modules and methods and other functions described herein may be implemented as hardware or as machine readable instructions stored on a non-transitory computer readable medium (e.g., memory, or other type of data storage device) and executable by hardware. The hardware may comprise a processor or another type of processing circuit, such as an application-specific integrated circuit.

Those skilled in the art will understand that the drawings are merely schematic drawings of an example, and the modules or flows in the drawings are not necessary essential for carrying out the disclosure.

Those skilled in the art will understand that the modules in the device in the examples can be distributed in the device in the examples according to the descriptions of the example, or they can be changed so as to be in one or more devices that are different from that in the examples. The modules in the above examples can be either combined into one module or further divided into several sub-modules.

The above sequential numbers mentioned are only for facilitating description, but they are not used to represent which example is more advantage.

The above description includes examples. Any modification, equivalent substitution and improvement made that are according to the spirit and principle of the examples shall be included in the protection scope.

What is claimed is:

1. A device for continuing to forward after switching occurs from a primary main control board to a standby main control board, wherein said device is located in a Fiber Channel (FC) switch which supports Fabric Shortest Path First (FSPF) protocol and comprises the primary main control board, an interface board and the standby main control board, and said device is disposed in the standby main control board of said FC switch and comprises:

a Link State Records (LSRs) backup module to receive neighbor LSRs sent by the primary main control board and back up the neighbor LSRs on the standby main control board;

a promotion control module to trigger the standby main control board to be promoted to the primary main control board;

a neighbor recovering module to establish an adjacency relationship with neighbors according to the neighbor LSRs backed up on the standby main control board, after the standby main control board is promoted to the primary main control board;

a LSRs generation module to generate LSRs of the switch based on available ports on the switch and the neighbors with which the adjacency relationship has been established;

a neighbor maintaining module to start to send a message for maintaining the adjacency relationship to the neighbors with which the adjacency relationship has been established; and a routing calculating module to calculate a routing based on the neighbor LSRs and the LSRs of the switch.

2. The device of claim 1, wherein said device further comprises:

a validity determination module to identify valid neighbor LSRs from the neighbor LSRs sent by the primary main control board, to make the neighbor LSRs which the neighbor recovering module and the routing calculating module are based on be valid neighbor LSRs.

3. The device of claim 2, wherein said validity determination module is to distinguish the valid neighbor LSRs according to an identification made on the neighbor LSRs by the primary main control board.

4. The device of claim 3, wherein said identification comprises a reserved field in the LSR header of the valid neighbor LSR which is an initial value, wherein a reserved field in an LSR header of an invalid neighbor LSR is a preset value different from said initial value;

or, said identification comprises a reserved field in a link description of the valid neighbor LSR which is an initial value, wherein a reserved field in a link description of an invalid neighbor LSR is a preset value different from said initial value.

5. The device of claim 1, wherein said device further comprises: a configuration backup module to back up on the standby main control board configuration management information of the switch sent by the primary main control board before sending the neighbor LSRs, wherein the configuration management information at least comprises a domain ID of the switch and port configuration information of the available port on the switch.

6. The device of claim 1, wherein the message for maintaining the adjacency relationship is a HLO message.

7. The device of claim 1, wherein the promotion control module is further to detect whether the primary main control board is in place or not, and if it is detected that the primary main control board is not in place, then the standby main control board is triggered to be promoted to the primary main control board.

8. A method for calculating routing after switching occurs from a primary main control board to a standby main control board in a Fiber Channel (FC) switch which supports Fabric Shortest Path First (FSPF) protocol, wherein said method comprises the following performed by the standby main control board:

receiving neighbor Link State Records (LSRs) sent by the primary main control board and backing up the neighbor LSRs on the standby main control board;

triggering the standby main control board to be promoted to the primary main control board;

establishing an adjacency relationship with neighbors according to the backed up neighbor LSRs;

generating LSRs of the switch based on available ports on the switch and the neighbors with which the adjacency relationship has been established;

starting to send a message for maintaining the adjacency relationship to the neighbors with which the adjacency relationship has been established; and calculating a routing based on the neighbor LSRs and the LSRs of the switch.

9. The method of claim 8, wherein after the receiving of the neighbor LSRs, said method further comprises:

identifying valid neighbor LSRs from the neighbor LSRs sent by the primary main control board.

10. The method of claim 9, comprising distinguishing the valid neighbor LSRs according to an identification made on the neighbor LSRs by the primary main control board.

11. The method of claim 10, wherein said identification comprises a reserved field in LSR headers of the valid neighbor LSRs which is an initial value, wherein a reserved field in an LSR header of an invalid neighbor LSR is a preset value different from said initial value;

or, said identification comprises a reserved field in a link description of the valid neighbor LSRs which is an initial value, wherein a reserved field in a link description of an invalid neighbor LSR is a preset value different from said initial value.

12. The method of claim 8, wherein, before the receiving of the neighbor LSRs, said method further comprises:

backing up on the standby main control board configuration management information of the switch sent by the primary main control board, wherein the configuration management information at least comprises a domain ID of the switch and port configuration information of the available ports on the switch.

13. The method of a claim 8, wherein the message for maintaining the adjacency relationship is a HLO message.

14. The method of a claim 8, wherein the triggering of the standby main control board to be promoted to the primary main control board further comprises detecting whether the primary main control board is in place or not, and if it is detected that the primary main control board is not in place, then the standby main control board is triggered to be promoted to the primary main control board.

* * * * *

UNITED STATES PATENT AND TRADEMARK OFFICE

CERTIFICATE OF CORRECTION

PATENT NO. : 8,824,275 B2
APPLICATION NO. : 13/524965
DATED : September 2, 2014
INVENTOR(S) : Changjun Zhang It is certified that error appears in the above-identified patent and that said Letters Patent is hereby corrected as shown below:

In the Claims

In column 12, line 56, in Claim 2, delete “be” and insert -- the --, therefor.

In column 14, line 28, in Claim 13, delete “of a” and insert -- of --, therefor.

In column 14, line 30, in Claim 14, delete “of a” and insert -- of --, therefor.

Signed and Sealed this
Sixteenth Day of December, 2014

Michelle K. Lee
*Deputy Director of the United States Patent and Trademark Office*